United States Patent
Bethge et al.

(10) Patent No.: US 7,387,184 B2
(45) Date of Patent: Jun. 17, 2008

(54) SETTING SYSTEM FOR PRE-CRASH SETTING OF A MOTOR VEHICLE SEAT

(75) Inventors: Thomas Bethge, Wennigsen (DE); Rainer Gerding, Hannover (DE)

(73) Assignee: Faurecia Autositze GmbH & Co. KG, Stadthagen (DE)

(*) Notice: Subject to any disclaimer, the term of this patent is extended or adjusted under 35 U.S.C. 154(b) by 538 days.

(21) Appl. No.: 10/815,594

(22) Filed: Apr. 1, 2004

(65) Prior Publication Data
US 2004/0212226 A1 Oct. 28, 2004

(30) Foreign Application Priority Data
Apr. 23, 2003 (DE) ................ 103 18 417

(51) Int. Cl.
*B60K 28/14* (2006.01)
(52) U.S. Cl. .............. 180/282; 180/268; 180/271
(58) Field of Classification Search ........... 180/282, 180/271, 274, 268; 297/216.1, 216.12, 216.13, 297/216.16, 216.19
See application file for complete search history.

(56) References Cited

U.S. PATENT DOCUMENTS

| | | | | |
|---|---|---|---|---|
| 6,142,564 A * | 11/2000 | Pajela et al. | ............ | 297/216.18 |
| 6,182,783 B1 * | 2/2001 | Bayley | ............ | 180/282 |
| 6,478,373 B1 * | 11/2002 | Hake et al. | ............ | 297/216.13 |
| 2006/0237960 A1 * | 10/2006 | Kudo et al. | ............ | 280/806 |

FOREIGN PATENT DOCUMENTS

| | | |
|---|---|---|
| DE | 196 24 587 A1 | 6/1996 |
| DE | 197 49 838 A1 | 11/1997 |
| DE | 19624587 | 3/1999 |
| DE | 19749838 | 6/1999 |
| DE | 199 36 627 A1 | 8/1999 |
| DE | 199 39 183 C1 | 8/1999 |
| DE | 199 61 799 A1 | 12/1999 |
| DE | 100 08 972 A1 | 2/2000 |
| DE | 19936627 | 2/2001 |
| DE | 101 15 523 A1 | 3/2001 |
| DE | 19961799 | 7/2001 |
| DE | 10008972 | 9/2001 |
| DE | 1993918 | 10/2002 |
| DE | 10115523 | 2/2004 |
| WO | WO 01/45979 A1 | 12/2000 |

* cited by examiner

*Primary Examiner*—Eric Culbreth
(74) *Attorney, Agent, or Firm*—Synnestvedt & Lechner LLP

(57) ABSTRACT

An adjusting arrangement for pre-crash adjustment of at least one vehicle component, in particular of a vehicle seat, is disclosed, having an adjusting device with two entry connections, and a control device for receiving an entry signal and output of a control signal to the adjusting device for adjusting the vehicle component in a crash—secure position. The switching device can be adjusted between a normal operating position and a quick adjustment position. The control device emits, upon recognizing a pre-crash situation, a switching signal for adjusting the switching device into the quick adjustment position, and a second voltage is applied at the entry connections of the adjusting device in the quick adjusting position, which is greater than a first voltage applied in the normal operating position.

8 Claims, 3 Drawing Sheets

SETTING SYSTEM FOR PRE-CRASH SETTING OF A MOTOR VEHICLE SEAT

CROSS REFERENCE TO RELATED APPLICATIONS

This application claims the priority of German Patent Application 103 18 417.1-21 filed on Apr. 23, 2003, the entire contents of which is hereby incorporated in total by reference.

BACKGROUND OF THE INVENTION

1. Field of the Invention

The invention relates to an adjusting system for a vehicle car seat.

2. Description of Related Art

A typical adjusting system is, for example, known from WO 01/45979 A1, DE 199 61 799 A1 and DE 197 49 838. In this instance, an imminent impact such as, for example, with an obstacle situated in front of the vehicle, is recognized by sensors on the vehicle and a control signal emitted by the control device to an adjusting device, so that same can set a crash—secure position of a vehicle component before the impact, for example, a restraining belt or a seat component.

In virtue of such an adjustment a higher level of crash—safety is possible in many situations. Nevertheless, frequently the time available after recognition of the pre-crash situation for adjustment of the vehicle component is too brief, in particular at high travel speeds of one's own or another's vehicle or with an inadequate performance of the adjusting device.

DE 199 39 183 C1 discloses a boarding assist, wherein upon actuating a release lever for a seat back adjustment, an adjusting motor is operated by the user for longitudinal adjustment of the seat with a higher speed that in the case of a normal comfort adjustment. DE 101 15 523 A1 discloses an aircraft seat arrangement, wherein two seats are connected via a data line and supplied with current by means of two separate systems, whereby upon failure of one component a switch-over to the partner component is done.

The object of the invention is to provide improvements upon known adjusting arrangements and, in particular, to make possible a safe adjustment of a pre-crash position.

SUMMARY OF THE INVENTION

The invention is based on the concept that upon recognition of a pre-crash situation, an adjustment by way of the adjusting device can be attained at a higher speed than in a normal operational adjustment, in that the supply voltage supplied to the adjusting device is increased. In general, applying a higher supply voltage to an adjusting arrangement could damage the adjusting arrangement because of overheating. According to the invention, the higher voltage is applied only in the pre-crash situation, and thus there is a higher voltage supply and accordingly higher power output of the adjusting arrangement only over a short period of time. Accordingly, minimal or no impairment occurs, since the involved components directly absorb the higher heat quantity over the short period of time.

According to the invention, without additional use of pyrotechnical means and without excessive equipment investment a fast, reversible adjustment of a safety—relevant vehicle component is achieved. If in the vehicle two input voltages, e.g. 12 V and 42 V, are present in the vehicle, the switching can effect a direct switchover between these supply voltage connections. If only one input voltage is available, an energy collector normally in a parallel operating position can be series connected between a supply voltage connection and an input connection of the adjusting device.

In this fashion, even in vehicle systems with only one supply voltage, a higher supply voltage is maintained for the short span of time of the pre-crash adjustment.

The invention will be described in more detail with reference to the appended drawings and several exemplary embodiments. Wherein:

DETAILED DESCRIPTION OF THE INVENTION

Figures 1A, 1B:
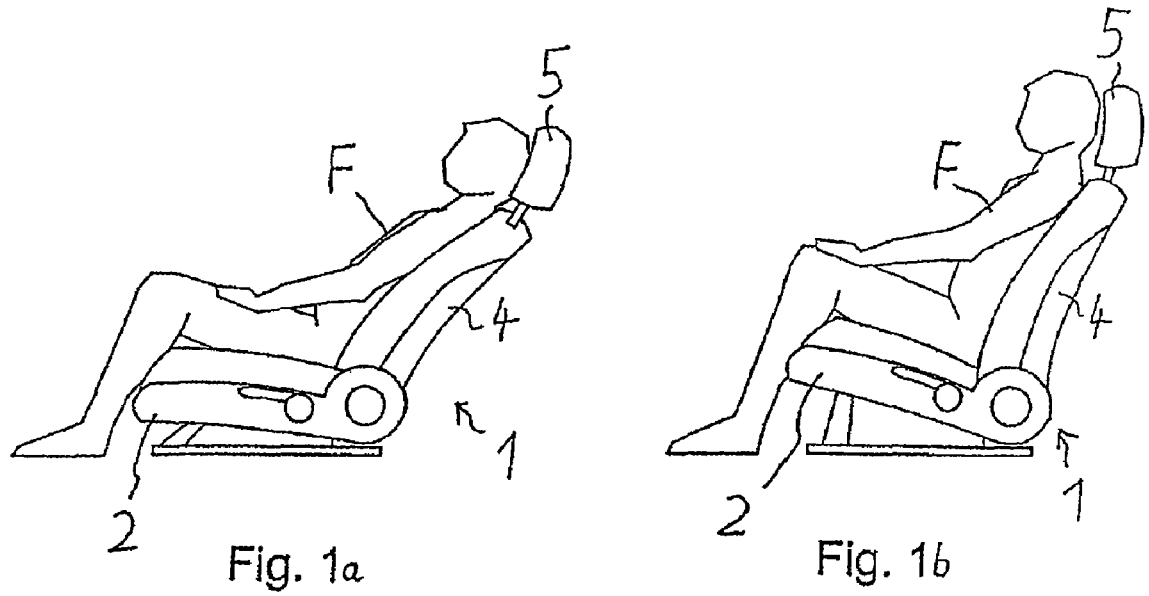
FIG. 1a represents a vehicle seat with the operator in the comfort position.
FIG. 1b represents a vehicle seat with the operator in the crash—secure position.

A person F sits in a vehicle seat 1 with a seat part 2, seat back 4 and headrest 5. In this instance, FIG. 1a represents a comfort position adjusted by the person. Upon recognizing a pre-crash situation the vehicle seat 1 is adjusted in the crash—secure position represented in FIG. 1b with an upright back rest 4 and forward raised seat part 2. In addition, if required, the seat part 2 and/or the head rest 5 could be adjusted forward.

Figure 2:
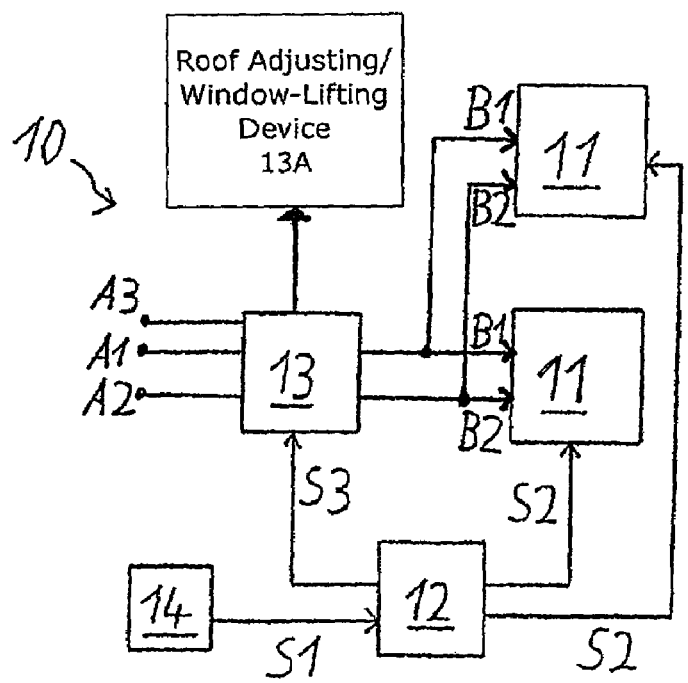
FIG. 2: represents a block diagram of an adjusting arrangement according to the invention.

An adjusting arrangement 10 according to FIG. 2 has one or a plurality of electrically operable adjusting arrangements 11, which are controlled by a control device 12 via a control signal S2 or via a plurality of control signals S2.

The control device 12 can be a central control device of the vehicle, which picks up measurement signals as input signals S1, e.g. distance measuring signals, from sensors 14 and from these recognizes a pre-crash situation. In addition, the control device 12 can also be a decentralized control device, which is used by the user for adjusting the vehicle seat 1; in this instance, the control device 12, picks up a pre-crash signal from a central control device.

Figure 3:
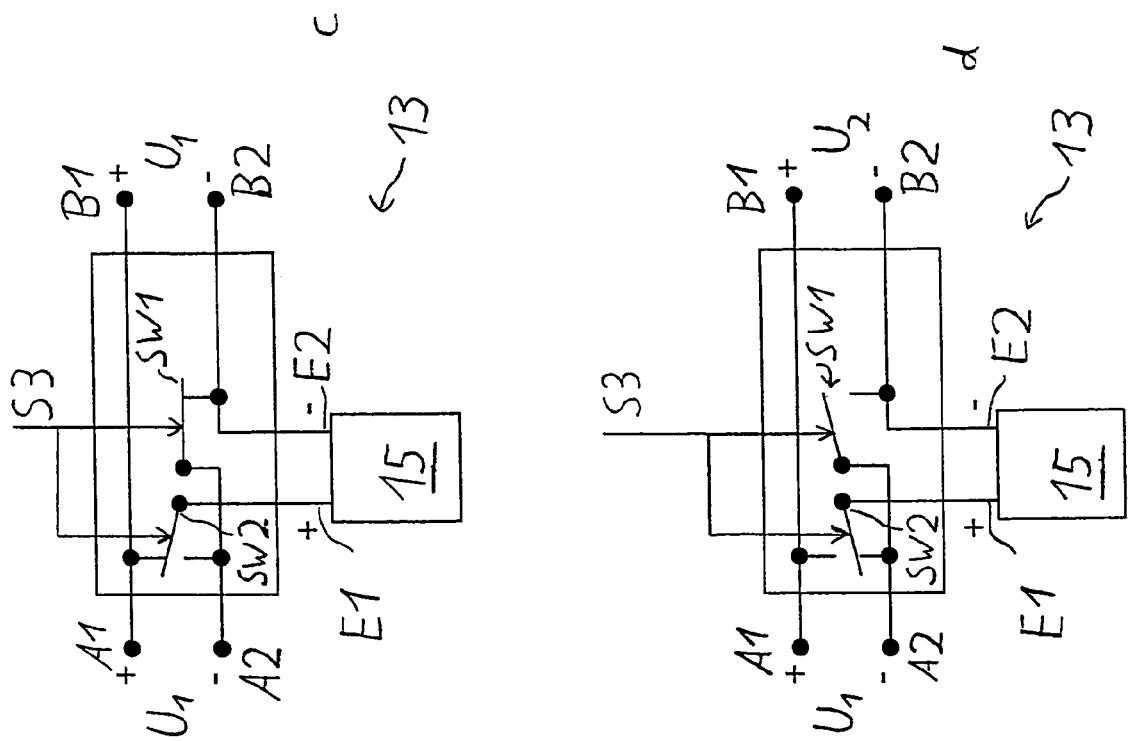
FIG. 3a shows the effective electrical path of the switching device 13 when the switches are in the positions illustrated in switching diagram 3c.
FIG. 3b shows the effective electrical path of the switching device 13 when the switches are in the positions illustrated in switching diagram 3d.
Figure 3:
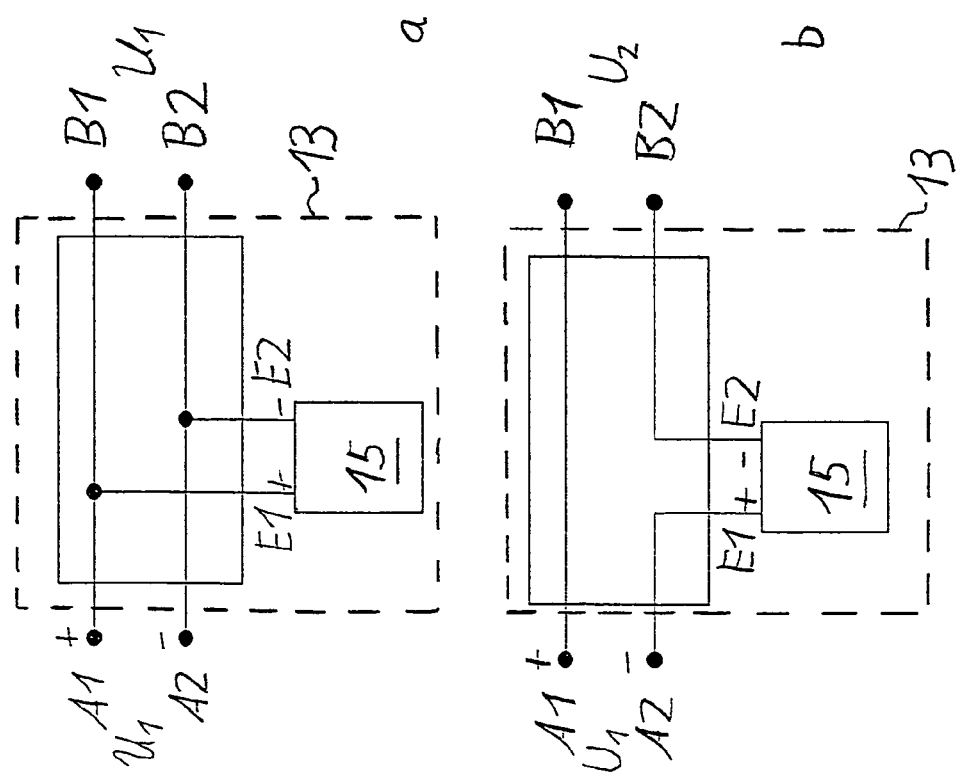
Figure 4:
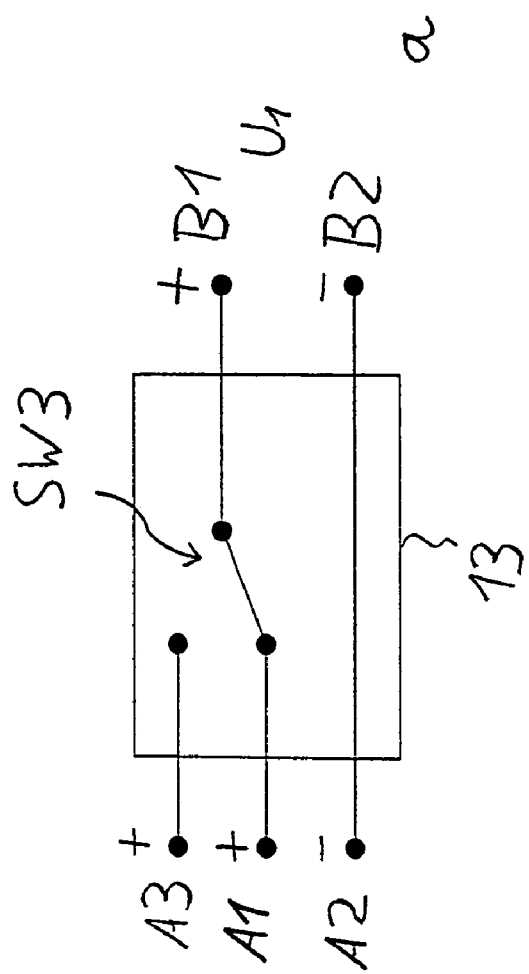
FIG. 4a represents a wiring diagram of a switching device according to a further embodiment in the normal operating position.
FIG. 4b represents the switching device of FIG. 4a in the quick adjusting position.
Figure 4:
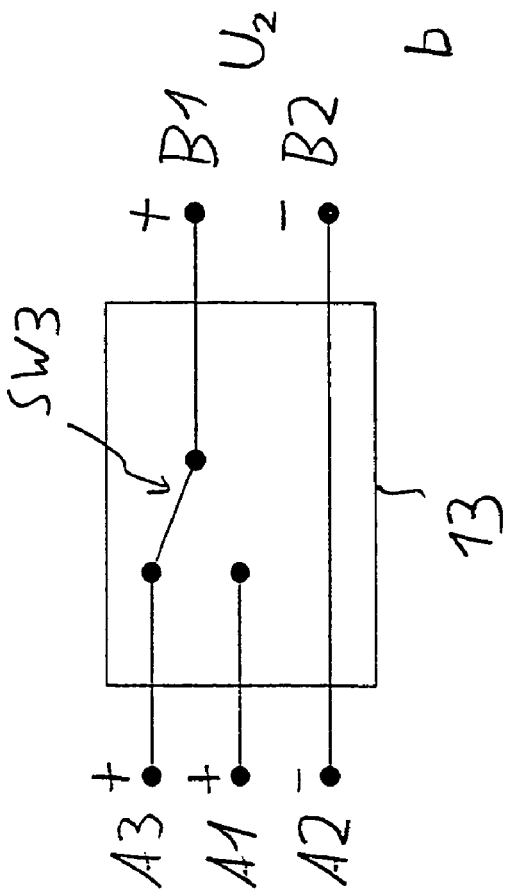

The control device 12 emits, after recognizing a pre-crash situation, a control signal S2 to the adjusting device 11, as well as a switching signal S3 to a switching device 13. The switching device 13 is connected at the input side in the embodiment of FIG. 3 to two supply voltage connections A1 and A2 and in the embodiment of FIG. 4 to three supply voltage connections A1, A2, A3. On the output side 13, input connections B1 and B2 of the parallel connected adjusting devices 11 are connected. A sliding roof adjusting device and/or window lifting device 13A can be connected to the switching device 13 so that these devices can also be switched by switching device 13.

The adjusting devices 11 are switched on by means of the control signals S2. An increase of the supply voltage emitted at the input connections B1, B2 is reached by means of the switching signal S3, as explained in the embodiments of FIGS. 3 and 4.

In the embodiments of FIGS. 3a-3d in the normal operating position of the switch device 13 (FIGS. 3a and 3c) the first and second supply voltage connectors A1, A2 having potentials of 12 V or ground are connected directly to the input connections B1, B2 of the adjusting devices 11(of FIG. 2). Accordingly, the output voltage is equal to the input voltage U1 of 12 V. An energy collector 15, advantageously a power capacitor with a capacity in the range of up to several Farads, up to 4 Farads for example, is switched into the normal operating position parallel to the adjusting device 11; that is, its first storage connection E1 lies at the positive supply voltage connector A1 and its second storage connection E2 is on the second supply voltage connector A2; that is, on ground.

In the quick adjustment position of FIGS. 3b and 3d, the energy storage 15 is wired between the second supply voltage connection A2 and a second input connection B2, so that during a subsequent period of time—as long as the energy storage 15 can hold its output voltage—between B1 and B2 the doubled supply voltage U2 of 24 volts is applied. If applicable, the voltage U2 in this case diminishes somewhat; however, even with a fall in voltage, an increase of the voltage U2 on the input connections B1, B2 vis-à-vis U1 is achieved.

FIGS. 3c and 3d represent a switching configuration (normal and quick-adjustment positions, respectively) with two switches SW1, SW2; namely an opening switch SW1 and a reversing switch SW2, which is appropriately switched by means of the switching signal S3; in the alternative, for example, three opening switches can also be used.

The embodiment of FIGS. 4a-4b is suitable for a vehicle having a two-voltage on-board electrical system, hence the use of three supply voltage connectors A1, A2, A3. In this instance, A2 is on ground, A1 on a potential of 12 V and A3 on a potential of 42 V. In this case, a switch SW3 places, in dependence on the switch signal S3, the first input connection B1 on the first supply voltage connector A1, whereby the normal operating position shown in FIG. 4a is reached, or on the third supply voltage connector A3, whereby the quick adjustment position shown in FIG. 4b is reached.

The adjusting system, in the absence of a pre-crash signal and/or after a pre-determined time after output of the switching signal, switches the switching device from the quick adjusting position back into the normal operating mode.

While the invention has been described with reference to the preferred embodiment thereof, it will be appreciated by those of ordinary skill in the art that modifications can be made to the parts that comprise the invention without departing from the spirit and scope thereof.

The invention claimed is:

1. An adjusting system for pre-crash adjustment of at least one vehicle seat of a vehicle, having an adjusting device having first and second input connections, and a control device for pick up of an input signal and output of a control signal to the adjusting device for adjusting the vehicle components into a crash—secure position;

wherein a switching device is provided between said first and second input connections of the adjusting device and first and second supply voltage connections of the vehicle; and wherein the switching device is adjustable between a normal operating position and a quick adjustment position; and wherein said control device emits, upon recognizing a pre-crash situation, a switching signal for adjusting the switching device into the quick adjustment position, and a second voltage is applied at the input connections of the adjusting device in the quick adjusting position, which is greater than a first voltage applied in the normal operating position.

2. The adjusting system according to claim 1, wherein the switching device is connected to said first and second supply voltage connections and has an energy storage means having two storage connections; and wherein the energy storage means in the normal operating position is connected in parallel to the adjusting device and in the quick adjusting position in series between said second supply voltage connection and said second input connection of the adjusting device.

3. The adjusting system according to claim 2, wherein the switching device has plural switching elements by means of which upon input of the switching signal the connection of said first supply voltage connection is interrupted with the first storage connection, the second supply voltage connection is connected to the first storage connection, and the connection of the second supply voltage connection with the second input connection is interrupted.

4. The adjusting system according to claim 1, wherein the switching device is connected to a third supply voltage connection and has a switch for selective connection of one of said first and second input connections with one of said first and third supply voltage connections.

5. The adjusting system according to claim 1, wherein a plurality of adjustment devices are connected in parallel to the switching device and each receive control signals from the control device.

6. The adjusting system according to claim 1, wherein said switching device is connected to a plurality of adjusting devices connected for at least one of a seat back tilting adjustment, a seat tilting adjustment, a head rest adjustment, and a seat height adjustment.

7. An adjusting system according to claim 1, wherein a sliding roof adjusting device and/or a window lifting device is connected to the switching device.

8. The adjusting system according to claim 1, wherein the control device, in the absence of a pre-crash signal and/or after a pre-determined time after output of the switching signal switches the switching device from the quick adjusting position back into the normal operating position.

* * * * *